(12) United States Patent
Bretschger et al.

(10) Patent No.: US 6,932,377 B2
(45) Date of Patent: Aug. 23, 2005

(54) STROLLER ASSEMBLY AND STROLLER ACCESSORY

(75) Inventors: Ted Bretschger, Hinsdale, IL (US); Peter J. Myers, Wheaton, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 102 days.

(21) Appl. No.: 10/423,296

(22) Filed: Apr. 25, 2003

(65) Prior Publication Data

US 2004/0212163 A1 Oct. 28, 2004

(51) Int. Cl.⁷ .................................................. B62B 7/00
(52) U.S. Cl. ...................... 280/642; 280/647; 280/658; 280/47.38; 224/409
(58) Field of Search ................................ 280/642, 647, 280/658, 47.371, 47.34, 47.4, 47.38; 455/344, 345, 346, 350; 224/409; 297/217.4, 217.5

(56) References Cited

U.S. PATENT DOCUMENTS

| | | | | |
|---|---|---|---|---|
| 4,754,901 A | * | 7/1988 | Villanueva et al. | 224/418 |
| 4,756,454 A | * | 7/1988 | Villanueva et al. | 224/418 |
| 4,974,759 A | * | 12/1990 | McDonough | 224/443 |
| 4,981,243 A | * | 1/1991 | Rogowski | 224/431 |
| 5,159,712 A | * | 10/1992 | Schneider et al. | 455/344 |
| 5,988,669 A | * | 11/1999 | Freese et al. | 280/642 |
| 6,219,428 B1 | * | 4/2001 | Tejeda, Jr. | 381/334 |
| 6,478,327 B1 | * | 11/2002 | Hartenstine et al. | 280/642 |
| 6,764,133 B2 | * | 7/2004 | Osato | 297/217.4 |
| 6,766,930 B2 | * | 7/2004 | Dixon et al. | 224/409 |
| 2002/0140260 A1 | | 10/2002 | Osato | 297/217.4 |
| 2002/0167140 A1 | * | 11/2002 | Pike et al. | 280/47.38 |

OTHER PUBLICATIONS

LM386 Low Voltage Audio Power Amplifier (Aug. 2000).
Quasar Project Kit #3115—1W Stereo Amplifier Module (circa 1999).

* cited by examiner

Primary Examiner—Christopher P. Ellis
Assistant Examiner—Brian Swenson
(74) Attorney, Agent, or Firm—Marshall, Gerstein & Borun LLP

(57) ABSTRACT

A stroller accessory including a frame having first and second attachment sites to attach the frame to a stroller, at least one speaker attached to the frame, and an input coupled to the at least one speaker. An amplifier circuit may be coupled between the at least one speaker and the input. The stroller accessory may be attached to a stroller.

18 Claims, 3 Drawing Sheets

STROLLER ASSEMBLY AND STROLLER ACCESSORY

FIELD OF DISCLOSURE

This specification relates generally to a stroller assembly and to a stroller accessory, and in particular to a stroller assembly including a stroller accessory having at least one speaker and to such a stroller accessory.

BACKGROUND

U.S. Patent Application Publication No. 2002/0140260 states that it relates to an audio system for canopies used with strollers or rockers. The '260 publication continues on to state that the system includes pockets attached to the canopy into which are disposed an audio source and two speakers. The '260 publication further states that the positions of the speaker pockets and the dimensions of the speakers are selected to take into account their preferred use with a canopy, its construction and dynamic operation thereof. The '260 publication also states that the speakers and speaker pockets have predetermined sizes and positions on the canopy to maximize the stereophonic affect for a child occupying the device, to minimize interference with extension or retraction of the canopy, and to generate high quality sound and volume.

However, system described in the '260 publication requires modification of the canopy of a typical stroller (i.e. the addition of pockets) to accommodate the audio source and speakers. Further, the wires connecting the audio source to the speakers are illustrated as being exposed, which may present an entanglement concern and may impede the operation of the canopy.

DESCRIPTION OF THE PREFERRED EXAMPLES

Figure 1:
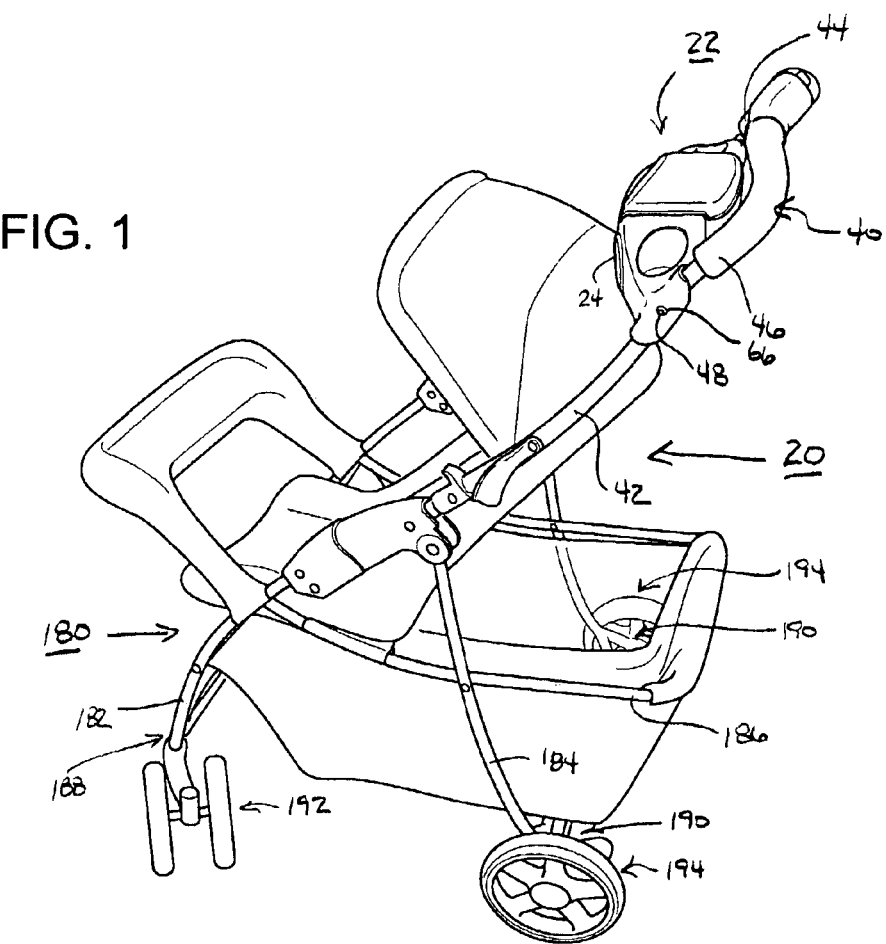
FIG. 1 is a perspective view of a stroller with a stroller accessory attached thereto.

A stroller 20 is shown in FIG. 1. A stroller accessory 22 may be attached to the stroller 20. The stroller accessory 22 may include first and second speakers 24, 26, which may be best seen in FIGS. 2 and 3. The speakers 24, 26 may be coupled to a personal audio device, such as a tape player, a CD (compact disk) player, a MP3 player, etc., through the use of plug 28, shown in FIG. 3. An amplifier circuit 30, which may be best seen in FIG. 5, may optionally couple the plug 28 to the speakers 24, 26.

Turning first to FIG. 1, the mechanism illustrated to attach the stroller accessory 22 to the stroller 20 will first be discussed.

As may be seen in FIG. 1, stroller 20 may have a U-shaped handle 40. That is, the handle 40 may have first and second legs 42, 44 which may be connected at a bight 46. Each of the legs 42, 44 may have a post, only one of which is shown at 48, depending therefrom.

The stroller accessory 22 may have a rigid or semi-rigid frame 60, which may, for example, be made of plastic, that has ends 62, 64. Each of the ends 62, 64 may have a hole 66, 68 formed therein, which may be best seen in FIGS. 2 and 3. The holes 66, 68 may be complementary to the posts 48 so as to receive one of the posts 48 disposed therethrough, as shown in FIG. 1. The cooperation of the posts 48 and the holes 66, 68 may thus attach the stroller accessory 22 to the stroller 20.

It will be recognized that other attachment mechanisms may be used to attach the stroller accessory 22 to the stroller 20. For example, the legs 42, 44 of the handle 40 may have recesses formed therein and the stroller accessory 22 may include posts that may be disposed within the complementary recesses to attach the stroller accessory 22 to the stroller 20. As a further alternative, posts may not be used; instead, for example, the shape of the handle 40 and the ends 62, 64 of the stroller accessory 22 may cooperate to limit separation and removal of the stroller accessory 22 from the stroller 20. As yet another alternative, detent mechanisms in the form of a spring-biased button may be substituted for the posts 48, which mechanisms may have a first state in which the button is disposed within the leg 42, 44 of the handle 40 and a second state in which the button depends from the leg 42, 44. Still other alternatives will be recognized.

Also, while the stroller accessory 22 is shown attached to the handle 40, the stroller accessory 22 may be attached to other sections of the stroller 20.

Having discussed the mechanism for attaching the stroller accessory 22 to the stroller 20, the structure of the stroller accessory 22 is now discussed.

The ends 62, 64 of the accessory frame 60 may each have a U-shaped channel 70, 72 formed therein. The shape of the channel 70, 72 may best be seen in FIG. 4. With reference to channel 70, for example, there may be an interior wall 74, an exterior wall 76 and an upper wall 78 that define the U-shaped channel 70. As shown in FIG. 1, the leg, for example the leg 42, may be disposed in the U-shaped channel, for example the channel 70, when the stroller accessory 22 is attached to the stroller 20.

It will be recognized that the U-shaped channels 70, 72 may be disposed at an angle relative to the remainder of the accessory frame 60 as shown. This may permit the portion of the accessory frame 60 that depends between the legs 42, 44 of the handle 40 to remain substantially parallel to the ground. However, the orientation of the channels 70, 72 relative to the remainder of the frame 60 may be modified from that shown in the Figures.

It will be further recognized that the channels 70, 72 may have a shape other than a U-shape. For example, the channels may have a C-shape, where the exterior wall 76 is not included and a lower wall is included. Other shapes may include an annular shape for the channels 70, 72. As a further alternative, only the exterior wall 76 may be present, with no opposing interior wall 74 included.

In addition to the channels 70, 72 disposed at the ends 62, 64 of the accessory frame 60, the stroller accessory frame 60 may have a number of recesses 80, 82, 84 formed therein. The largest recess, or device recess, 80 may be sized to accommodate a personal audio device, which may be disposed therein. Moreover, the plug 28, which may be used to couple the personal audio device (not shown) with the speakers 24, 26 and, optionally, the amplifier circuit 30, may also be disposed within the device recess 80 (see FIG. 3). The recesses 82, 84 may be dimensioned to permit a beverage container to be disposed therein.

Figure 2:
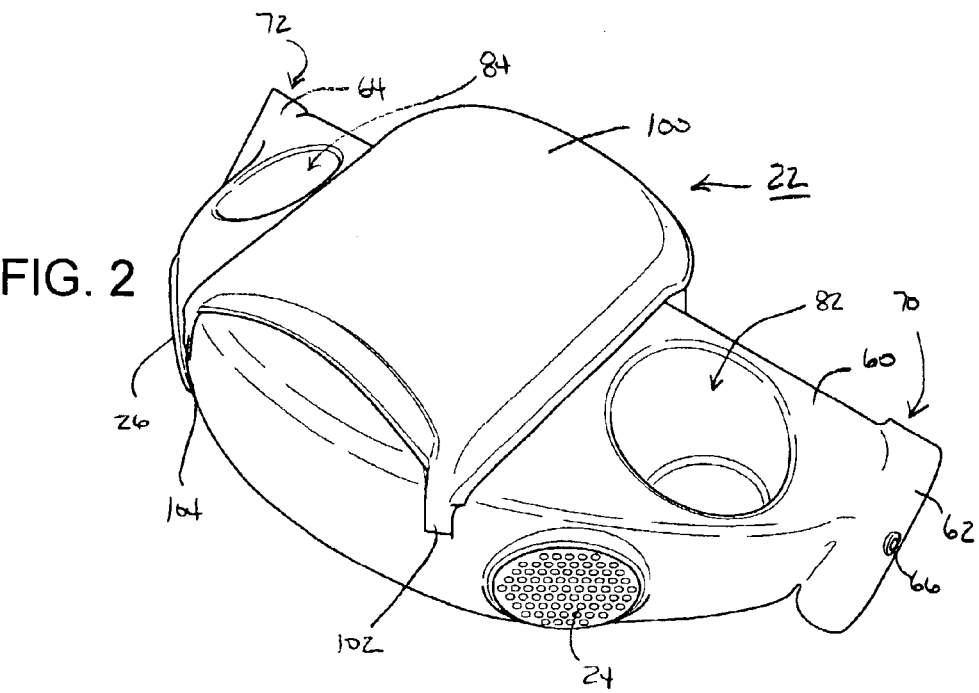
FIG. 2 is a perspective view of the stroller accessory shown in FIG. 1 with a door in a closed state.
Figure 3:
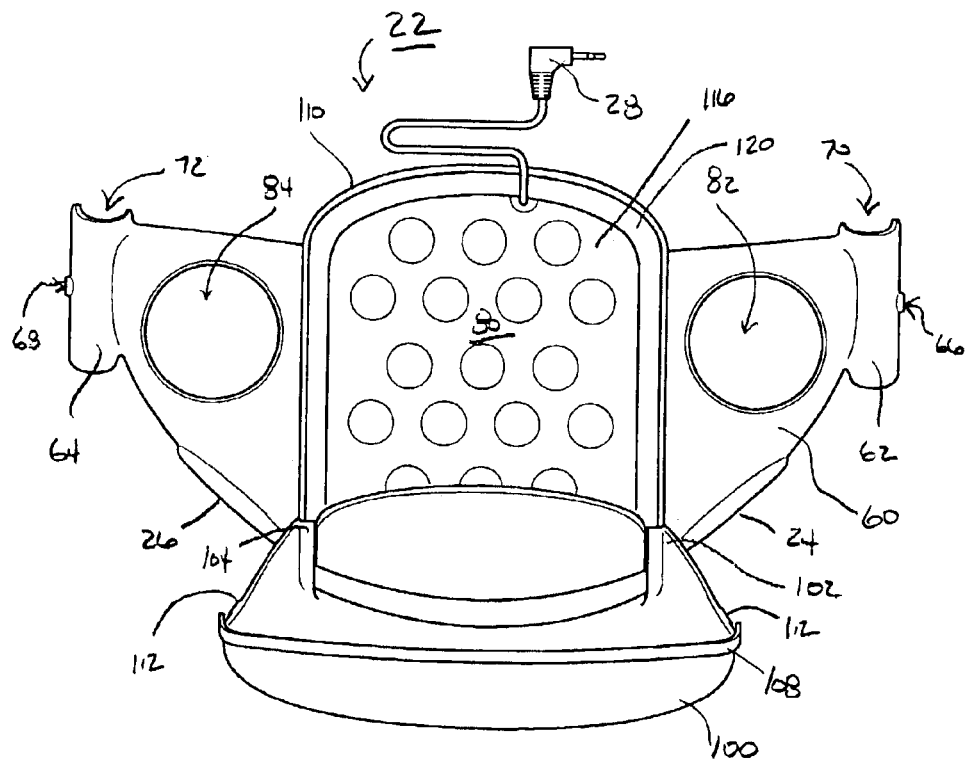
FIG. 3 is a plan view of the stroller accessory shown in FIG. 1 with the door in an open state.
Figure 4:
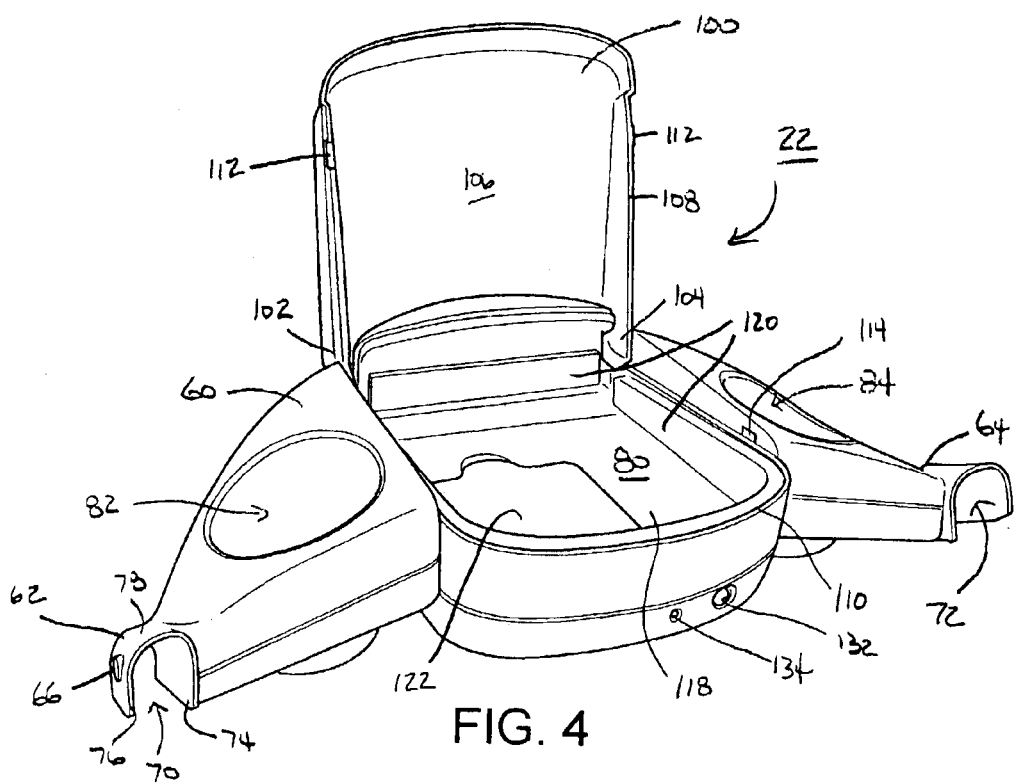
FIG. 4 is a perspective view of the stroller accessory shown in FIG. 1 with the door in an open state.

Furthermore, a door 100 may be attached to the accessory frame 60. As shown in FIG. 2, the door 100 may have a closed state, as will be explained in greater detail below. As shown in FIGS. 3 and 4, the door 100 may also have an open state, also as further explained below.

The door 100 may be pivotally attached to the accessory frame 60 at hinges 102, 104 so that the door 100 may be moveable relative to the accessory frame 60 between the open state (FIG. 2) and the closed state (FIGS. 3 and 4). The door 100 may have a surface 106 that may be disposed over the device recess 80 in the closed state shown in FIG. 2, so as to limit access to a personal audio device disposed within the device recess 80. The surface 106 of the door 100 may be spaced from the device recess 80 in the open state shown in FIGS. 3 and 4 to permit access to a personal audio device disposed in the device recess 80. With the door 100 in the closed state shown in FIGS. 3 and 4, a lip 108 of the door 100 may cooperate with a wall 110 that defines the device recess 80 to fully enclose a personal audio device disposed in the device recess 80.

Arranged along the lip 108 of the door 100 may be a pair of hooks 112 which may cooperate with a pair of recesses 114 (only one of which is shown in FIG. 4) formed in the stroller accessory frame 60. The cooperation of the hooks 112 and the recesses 114 may limit the movement of the door 100 between the closed state shown in FIG. 2 and the open stage shown in FIGS. 3 and 4. That is, a certain degree of force may need to be exerted against the door 100 to deflect the hooks 112 such that the hooks 112 separate from the recesses 114 and the door 100 may be pivoted about its hinges 102, 104 from the closed state to the open state.

As will also be noted in FIGS. 3 and 4, a cushion 116 may be disposed along a floor 118 of the device recess 80 defined by the accessory frame 60. Cushions 120 may also be attached or mounted to the surface of the wall 110, as shown in FIGS. 3 and 4. The cushions 116, 120 may be made of a foam material, and may be used to absorb the shock that the personal accessory device disposed within the device recess 80 experiences during movement of the stroller 20. As will be noted by comparing FIG. 3 with FIG. 4, the cushion 116 may be removable so as to expose the floor 118, and in particular a door 122 of a battery compartment (not shown) which may be disposed flush with the floor 118.

While the speakers 24, 26 may be attached to the front of the stroller accessory 22 and the hinges 102, 104 of the door 100 may be disposed along the edge of the door 100 closest to the front of the stroller accessory 22, other orientations are possible. For example, the speakers may be attached to the rear of the stroller accessory 22, or to the sides. Moreover, the hinges 102, 104 of the door 100 may also be disposed along the edge of the door 100 closest to one of the ends 62, 64 of the stroller accessory 22, or along the edge of the door 100 closest to the rear of the stroller accessory 22.

Having thus far described the structure of the accessory 22, the amplifier circuit 30 will now be discussed with reference to FIG. 5.

The amplifier circuit 30 may include a power supply 130; as shown, the power supply 130 may be in the form of one or more batteries. The power supply 130 may be coupled to the remainder of the amplifier circuit 30 through a switch 132 (see also FIG. 4). With the switch 132 closed, a diode 134 may be energized, providing the user with a visual indication that the switch 132 has been closed and that the batteries are not in need of replacement (see also FIG. 4). The diode 134 may be coupled to the switch 132 by a resistor 136.

Figure 5:
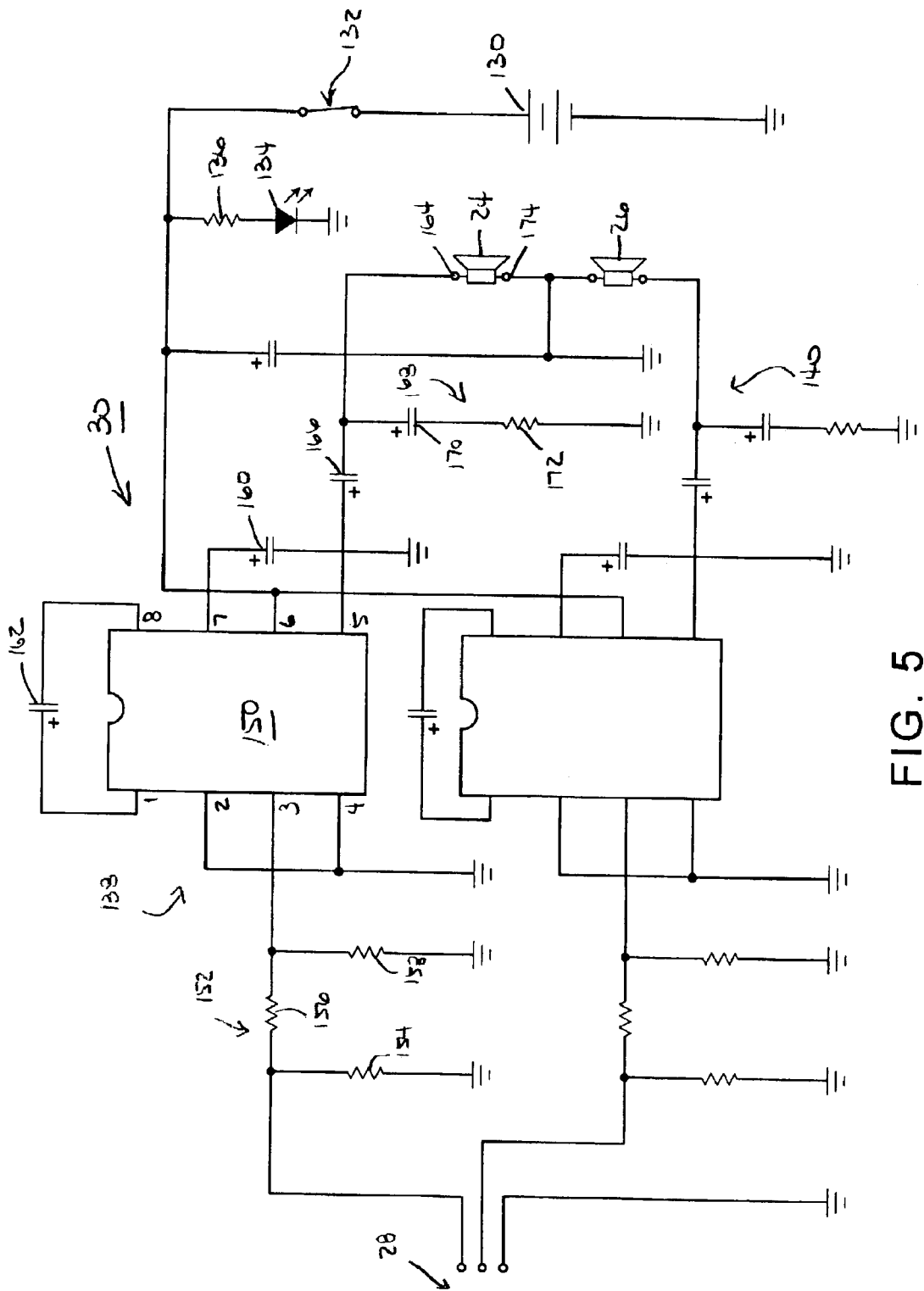
FIG. 5 is a schematic of speakers and an amplifier circuit for use in the stroller accessory of FIG. 1.

Also shown in the schematic of FIG. 5 are the speakers 24, 26 and the plug 28. Coupled between the plug 28 and the speakers 24, 26 may be two identical power amplifier circuits 138, 140. Given the similarities between the power amplifier circuits 138, 140, only the power amplifier circuit 138 will be discussed below.

The power amplifier circuit 138 may include a LM386 power amplifier 150. The pins of the power amplifier 150 have been numbered in a conventional fashion, and will be referred to herein as pins 1–8. Starting on the left side of the power amplifier 150 and moving in a clockwise fashion, the input from the plug 128 may be coupled to a resistor bridge 152 formed of resistors 154, 156, 158, which in turn may be coupled to pin 3 of the power amplifier 150. Pins 2 and 4 of the power amplifier 150 may be coupled to ground, as may be pin 7 via a capacitor 160. Pins 1 and 8 may be coupled to each other via a capacitor 162, thereby increasing the gain of the power amplifier 150. Pin 6 may be coupled to the power supply 130. Pin 5 may be coupled to the first terminal 164 of the speaker 24 via a capacitor 166 and a Zobel network 168 including a capacitor 170 and a resistor 172, while the second terminal 174 of the speaker 24 may be coupled to ground.

As has been mentioned previously, the amplifier circuit 30 may be optional in the stroller accessory 30. Moreover, while one example of amplifier circuit 30 has been discussed, including power amplifiers 150, it will be recognized that other amplifier circuits 30 may be utilized. Furthermore, it will be also recognized that the power amplifier circuits 138, 140 may be varied as well; for example, a variable resistor may be used in place of the resistor bridge 152, or a resistor may be coupled in series with the capacitor 162 to vary the gain of the power amplifier 150.

In operation, the user of the stroller 20 may apply force to the lip 108 of the door 100 to disengage the hooks 112 from the recesses 114 and to move the door 100 into the open state shown in FIGS. 3 and 4. In this state, the plug 28 may be accessible, to be coupled to a personal audio device of the user, which device may then disposed in the device recess 80. At this point the door 100 may be moved such that the surface 106 of the door 100 may be disposed over the personal audio device, as shown in FIG. 2. In this state, the hooks 112 may engage the recesses 114 to limit the movement of the door between the open state shown in FIGS. 3 and 4 and the closed state shown in FIG. 2.

The user may then use the switch 132 to couple the batteries 130 to the remainder of the amplifier circuit 30. With the plug 28 coupled to the personal audio device, the output of the personal audio device may be provided to the amplifier circuit 30, and from the amplifier circuit 30 to the speakers 24, 26.

In addition to the alternatives mentioned previously, still other alternatives will be recognized.

For example, as shown, the stroller 20 may include a collapsible stroller frame 180 with a front frame assembly 182, a rear frame assembly 184, and a basket frame assembly 186. The front frame assembly 182 may be pivotally attached to the handle 40 and the basket frame assembly 186, and the rear frame assembly 184 may be pivotally attached to the handle 40 and the basket frame assembly 186. However, the stroller accessory 22 may be used with strollers 20 having other frames, both collapsible and fixed.

Moreover, as shown, the front frame assembly 182 may include first and second wheel attachment sites 188 and the rear frame assembly 184 may include first and second wheel attachment sites 190. Also as shown, first and second wheel assemblies 192 may be attached to the first and second wheel attachment sites 188 and pivotal about a substantially vertical axis relative to the stroller frame 180, and first and second wheel assemblies 194 may be attached to the first and second wheel attachment sites 190. However, the stroller accessory 22 may be used with strollers 20 having a single front wheel attachment site and wheel assembly, or with strollers 20 wherein none or all of the wheel assemblies are pivotal about a substantially vertical axis.

In fact, although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A stroller assembly comprising:

a stroller frame; and an accessory including a rigid plastic accessory frame, a speaker, and an input couplable to a personal audio device, the rigid plastic accessory frame attached to the stroller frame, the speaker attached to the rigid plastic accessory frame, and the input coupled to the speaker, the accessory frame having a device recess formed therein sized to receive a personal audio device therein, the accessory including a rigid plastic door pivotally attached to the accessory frame, the rigid plastic door having a first state wherein a surface of the rigid plastic door is disposed over the device recess to limit access to a personal audio device disposed therein and a second state wherein the surface of the rigid plastic door is spaced from the device recess to permit access to a personal audio device disposed therein, and the input having a first end coupled to the speaker and a second end disposed within the device recess.

2. The stroller assembly according to claim 1, wherein:

the stroller frame comprises a handle with first and second spaced apart legs; and the accessory frame has first and second spaced apart ends, each of the ends having a channel formed therein to receive one of the first and second legs.

3. The stroller assembly according to claim 2, wherein:

each leg has a post; and each end of the accessory frame has a hole through which one of the posts is disposed to attach the accessory to the stroller frame.

4. The stroller assembly according to claim 1, wherein the door has a hook disposed thereon and the accessory frame includes a recess therein, the hook cooperating with the recess to limit the movement of the door relative to the accessory frame.

5. The stroller assembly according to claim 1, wherein the accessory frame has a container recess formed therein, the container recess dimensioned to permit a beverage container to be disposed therein.

6. The stroller assembly according to claim 1, comprising an amplifier circuit coupled between the speaker and the input.

7. The stroller assembly according to claim 1, the stroller frame comprising:

a front frame assembly, a rear frame assembly, a basket frame assembly, and a handle, the front frame assembly pivotally attached to the handle and the basket frame assembly, and the rear frame assembly pivotally attached to the handle and the basket frame assembly.

8. The stroller assembly according to claim 7, wherein the front frame assembly comprises first and second wheel attachment sites and the rear frame assembly comprises first and second wheel attachment sites, and the stroller assembly comprising:

first and second wheel assemblies attached to the first and second wheel attachment sites of the front frame assembly and pivotal about a substantially vertical axis relative to the stroller frame; and first and second wheel assemblies attached to the first and second wheel attachment sites of the rear frame assembly.

9. The stroller assembly according to claim 1, wherein the stroller accessory includes a cushion disposed in the device recess on which a personal audio device may be disposed.

10. The stroller assembly according to claim 9, the accessory frame including a rigid wall that defines the device recess, and comprising another cushion attached to the wall.

11. The stroller assembly according to claim 10, wherein the cushion and the another cushion comprise foam.

12. A stroller assembly comprising:

a stroller frame including a handle having first and second spaced apart legs, each leg having a post depending therefrom; and an accessory including a rigid accessory frame, a door, two speakers, an amplifier circuit, and an input, with the speakers coupled to the amplifier circuit and the amplifier circuit coupled to the input, the accessory frame attached to the handle assembly with the posts disposed through a pair of complementary holes in the frame, the accessory frame having a recess formed therein to receive a personal audio device with the input disposed therein, the door pivotally attached to the accessory frame, the door having a first state wherein a surface of the door is disposed over the device recess to limit access to a personal audio device disposed therein and a second state wherein the surface of the door is spaced from the device recess to permit access to a personal audio device disposed therein, the accessory frame having a wall and a floor that define the device recess with foam pads disposed on the floor and attached to the wall.

13. A stroller accessory comprising:

a rigid frame having first and second attachment sites to attach the frame to a stroller, the frame having a device recess formed therein sized to receive a personal audio device therein;

at least one speaker attached to the frame;

an input coupled to the at least one speaker; and a rigid door pivotally attached to the frame, the rigid door having a first state wherein a surface of the rigid door is disposed over the device recess to limit access to a personal audio device disposed therein and a second state wherein the surface of the rigid door is spaced from the device recess to permit access to a personal audio device disposed therein.

14. The stroller accessory according to claim 13, wherein:
- the frame has first and second ends, the first attachment site defined at the first end and the second attachment site defined at the second end, and
- each attachment site defined by a channel having a wall with a hole therethrough.

15. The stroller accessory according to claim 13, wherein:
- the stroller accessory has a rigid wall and a rigid floor that define the device recess and foam cushions are disposed on the floor and attached to the wall.

16. The stroller accessory according to claim 13, wherein the door has a hook disposed thereon and the accessory frame includes a recess therein, the hook cooperating with the recess to limit the movement of the door relative to the accessory frame.

17. The stroller accessory according to claim 13, wherein the accessory frame has a container recess formed therein, the container recess dimensioned to permit a beverage container to be disposed therein.

18. The stroller accessory according to claim 13, comprising an amplifier circuit coupled between the at least one speaker and the input.

* * * * *